(12) United States Patent
Grundler

(10) Patent No.: US 7,182,377 B2
(45) Date of Patent: Feb. 27, 2007

(54) KITCHEN SPATULA WITH OFFSET HANDLE

(76) Inventor: Frank D. Grundler, 6570 Ambrosia La. #1321, Carlsbad, CA (US) 92009

( * ) Notice: Subject to any disclaimer, the term of this patent is extended or adjusted under 35 U.S.C. 154(b) by 0 days.

(21) Appl. No.: 10/371,648

(22) Filed: Feb. 24, 2003

(65) Prior Publication Data

US 2004/0164569 A1 Aug. 26, 2004

(51) Int. Cl.
A47J 43/28 (2006.01)

(52) U.S. Cl. .......................................... 294/7

(58) Field of Classification Search .................. 294/6, 294/7, 8; D28/7; 15/245; 16/110.1, DIG. 18, 16/DIG. 19
See application file for complete search history.

(56) References Cited

U.S. PATENT DOCUMENTS

| | | | | |
|---|---|---|---|---|
| 2,065,886 A | * | 12/1936 | Clift | 15/245 |
| 2,188,114 A | * | 1/1940 | Hubbard | 294/55 |
| 2,489,606 A | * | 11/1949 | Merrill | 294/7 |
| 2,900,656 A | * | 8/1959 | Tupper | 15/245 |
| 2,964,773 A | * | 12/1960 | Pence | 15/245 |
| 3,877,143 A | * | 4/1975 | Montesi | 30/114 |
| 3,906,632 A | * | 9/1975 | Oppenheimer | 294/7 |
| 4,319,399 A | * | 3/1982 | Ciaffone | 30/32 |
| D272,661 S | * | 2/1984 | Cutler | D28/7 |
| D286,576 S | * | 11/1986 | Schneider et al. | D28/7 |
| D302,776 S | * | 8/1989 | Hiscott et al. | 294/7 |
| 5,491,869 A | * | 2/1996 | Sullivan et al. | 15/245 |
| 5,875,515 A | * | 3/1999 | Dallas | 294/49 |
| 5,953,785 A | * | 9/1999 | Malmborg | 15/244.1 |
| D467,686 S | * | 12/2002 | Kohler | D28/7 |

FOREIGN PATENT DOCUMENTS

SU  001774860  * 11/1992  .................. 294/7

* cited by examiner

*Primary Examiner*—Eileen D. Lillis
*Assistant Examiner*—Paul T. Chin
(74) *Attorney, Agent, or Firm*—Kirk A. Buhler; Buhler & Associates

(57) ABSTRACT

An improved spatula is presented that has a handle shaped to permit easy removal of the contents of condiment containers. The spatula handle possesses a double angled offset such that when held in the hand, the spatula head makes flush contact with the walls of a condiment container.

4 Claims, 2 Drawing Sheets

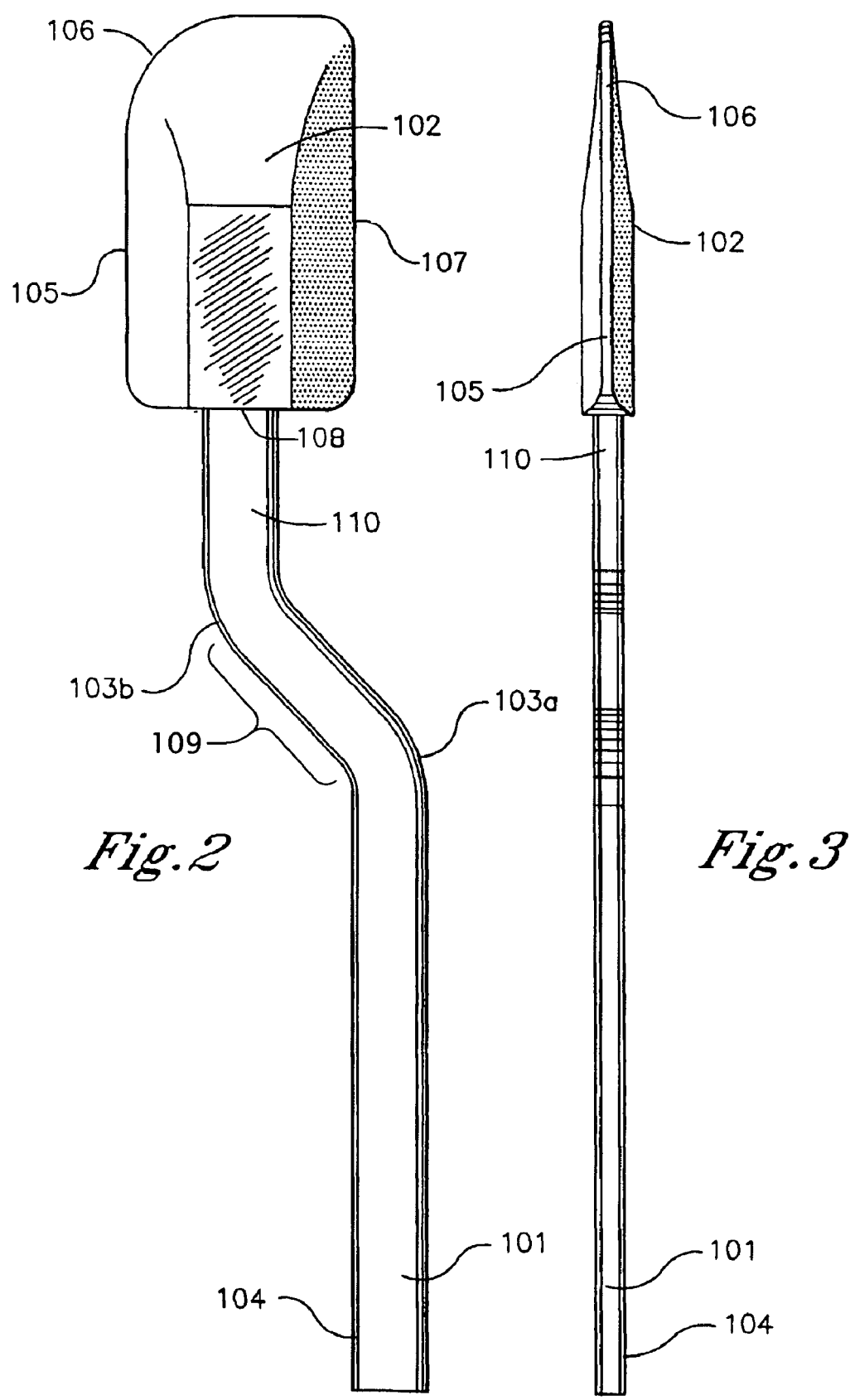

KITCHEN SPATULA WITH OFFSET HANDLE

BACKGROUND OF THE INVENTION

1. Field of the Invention

The present invention relates to spatulas and scrapers used to spread condiments or obtain condiments from jars.

2. Description of Related Art

In the prior art, spatulas of this kind are comprised of a handle made from stiff or slightly flexible material and a spatula head made from a flexible material that returns to its original planar shape after it is used. The flexible spatula head often has a pointed, right-angled edge and a rounded edge at its farthest extension.

Previous spatula design have attempted to deal with the problem of using the spatula inside a jar, where the user inserts the flexible head as far down into the condiment jar as possible nd scrapes the sides and the bottom. Because previous designs have used a straight or straight-angled handle, the flat side edge of the spatula head has never come into direct, flat contact with the side of a standard condiment jar. There has always been the problem that the spatula head is canted so that only a portion of the flat edge is in contact with the jar side.

SUMMARY OF THE INVENTION

The present invention consists of a rigid or slightly flexible handle attached to a flexible spatula head. The handle is constructed with a double angle, such that when held, the flat sides of the spatula head are parallel to the portion of the handle grasped by the user. The angle or angles taken by the double-angled handle are a matter of design and projected function, and could be any angle less than 90 degrees.

This invention can be used to scrape out condiment jars or to spread condiments. The improved handle design will keep the user's hand above the spreading surface to avoid hand contact with the condiments being spread.

It is an object of this invention to provide an improved spatula with a handle possessing a double angle to permit easier use in condiment jars.

It is another object of this invention to provide a spatula with an improved head shape to better fit condiment jars.

It is a further object of this invention to provide an improved spatula with a double-angled handle that is available in a variety of handle angles to fit different jars and containers.

BRIEF DESCRIPTION OF THE DRAWINGS

Further objects and features of the present invention are disclosed by the accompanying figures:

FIG. 2 shows the device in side view.
FIG. 3 shows the device in top view.

DETAILED DESCRIPTION OF THE PREFERRED EMBODIMENT

Figure 1:
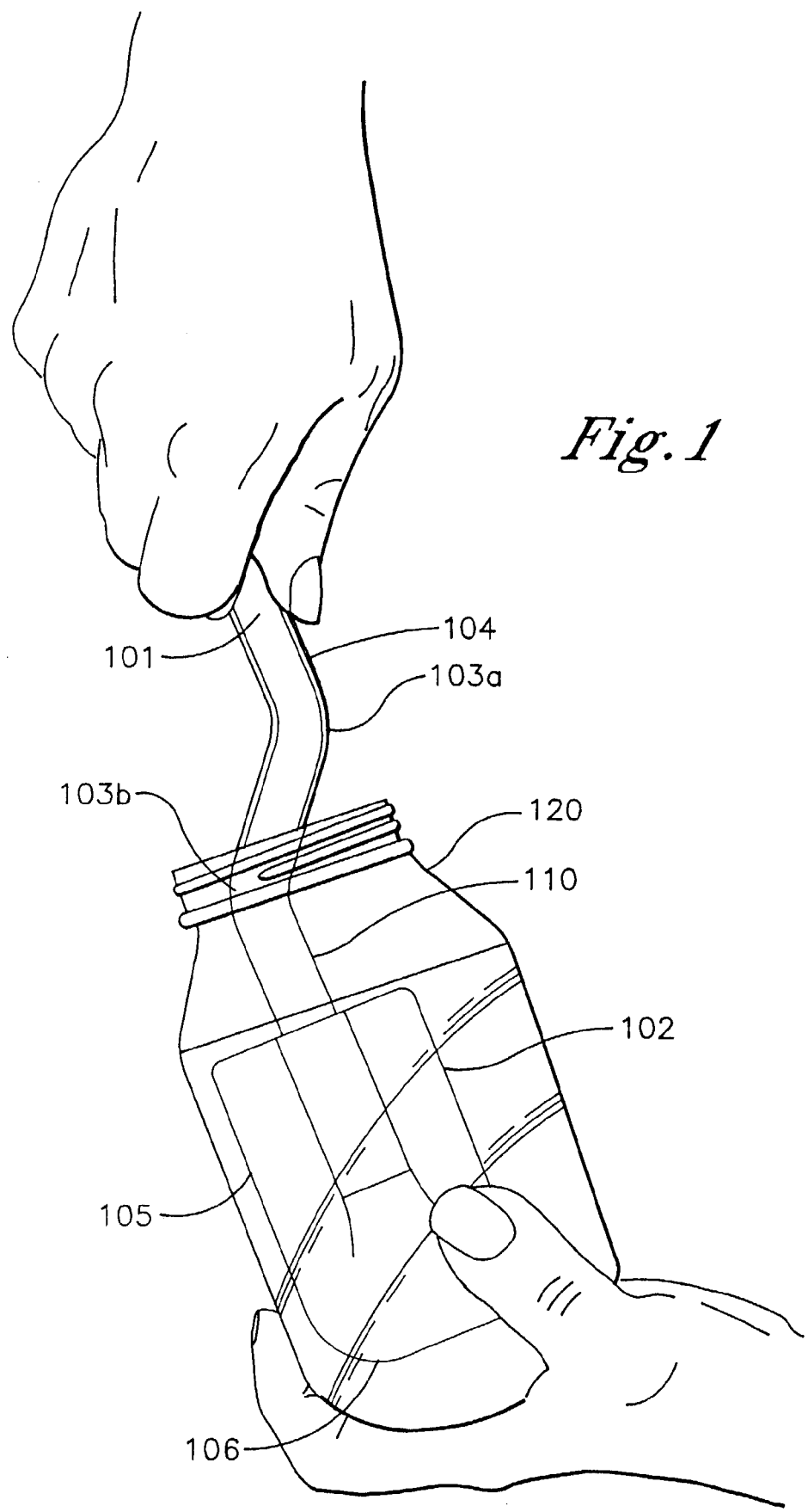
FIG. 1 shows the device in use in a condiment jar.

Referring to FIG. 1, the invention consists of handle[101] and a spatula head[102], the handle[101] possessing an angle[103a] near the grasping end[104] of the handle[101] and an angle[103b] near the spatula head[102]. In the preferred embodiment, these two angles are the same trigonometric angle.

The handle[101] is made of a rigid or slightly flexible material. Possible materials include wood, plastic, metal or ceramic. The spatula head[102] is comprised of a flexible material that resumes its shape after being flexed, such as plastic or rubber.

In FIG. 1, it can be seen that the angles[103a, 103b] in the handle[101] allow the flat spreading edge[105] of the spatula to lie next to the side of the condiment container[120]. This permits easier scraping of the contents of the container[120]. The spatula head[102] also possess a rounded end[106] of the spreading edge that fits the curvature of condiment containers, making removal of contents at the bottom of such a container[120] easier.

In FIG. 2, The general shape of the invention can be seen. The grasping end[104] of the handle[101] is in a line parallel and above the upper edge[107] of the spatula head[102]. The head attachment portion[110] of the handle[101] is inserted into the receiving edge[108] of the spatula head[102] and in the preferred embodiment is held fixedly.

The downward offset portion of the handle[109] is at an angle[103a] to the grasping end[104] and is at an angle[103b] to the head attachment portion[110] of the handle[101]. The handle[101] can be held in the spatula head[102] removably in other instantiations of this invention.

This invention has other applications, potentially, and one skilled in the art could discover these. The explication of the features of this invention does not limit the claims of this application; other applications developed by those skilled in the art will be included in this invention.

What is claimed is:

1. A spatula for spreading condiments, the spatula comprised of a handle and a spatula head, the handle comprised of a grip portion, a downward offset portion and a head attachment portion, the downward offset portion connected to the grip portion at an angle, the head attachment portion connected to the other end of the downward offset portion at the same angle, the grip portion and the head attachment portion positioned such that they are parallel to each other, the grip portion, downward offset portion, and head attachment portion positioned such that they lie in a single geometric plane, the spatula head a flat piece of flexible material bounded by a handle receiving edge, flanked on the sides with a flat upper edge on one side, a spreading edge on the other side with, and a curved end opposite the handle receiving edge, the flat upper edge parallel to the grip portion and the head attachment portion of the handle, the head attachment portion of the handle connected to the handle receiving edge, the spreading edge running along the side of the spatula head opposite the flat upper edge starting at the handle receiving edge and terminating in the curved end, the curved end running along the side of the spatula head opposite the receiving edge, the curved end terminating at the end of the flat upper edge, the flat spatula head lying in the same geometric plane as the plane formed by the handle.

2. The spatula as in claim 1 where the curved end is a curve in the shape of a quarter circle.

3. The spatula as in claim 1 where the head attachment portion of the handle is attached fixedly to the handle receiving edge of the spatula head.

4. The spatula as in claim 1 where the head attachment portion of the handle is attached removably to the handle receiving edge of the spatula head.

* * * * *